US012080506B2

(12) United States Patent
Mohammadi et al.

(10) Patent No.: US 12,080,506 B2
(45) Date of Patent: Sep. 3, 2024

(54) SILICON-BASED VACUUM TRANSISTORS AND INTEGRATED CIRCUITS

(71) Applicant: Purdue Research Foundation, West Lafayette, IN (US)

(72) Inventors: Saeed Mohammadi, Zionsville, IN (US); Shabnam Ghotbi, Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 18/242,185

(22) Filed: Sep. 5, 2023

(65) Prior Publication Data

US 2024/0186097 A1 Jun. 6, 2024

Related U.S. Application Data

(63) Continuation of application No. 17/701,298, filed on Mar. 22, 2022, now Pat. No. 11,749,487.

(60) Provisional application No. 63/164,169, filed on Mar. 22, 2021.

(51) Int. Cl.
*H01J 21/20* (2006.01)

(52) U.S. Cl.
CPC .................................... *H01J 21/20* (2013.01)

(58) Field of Classification Search
CPC ....................................................... H01J 21/20
See application file for complete search history.

(56) References Cited

U.S. PATENT DOCUMENTS 11,749,487 B2 * 9/2023 Mohammadi ........... H01J 21/20 257/10
2012/0314726 A1 * 12/2012 Lee ........................ B82Y 20/00 977/890

* cited by examiner

*Primary Examiner* — Joseph L Williams
(74) *Attorney, Agent, or Firm* — Piroozi-IP, LLC

(57) ABSTRACT

A field emitter array (FEA) vacuum transistor is disclosed which includes a substrate and a plurality of nanorods formed of a first polarity dopant on the substrate.

14 Claims, 18 Drawing Sheets
(12 of 18 Drawing Sheet(s) Filed in Color)

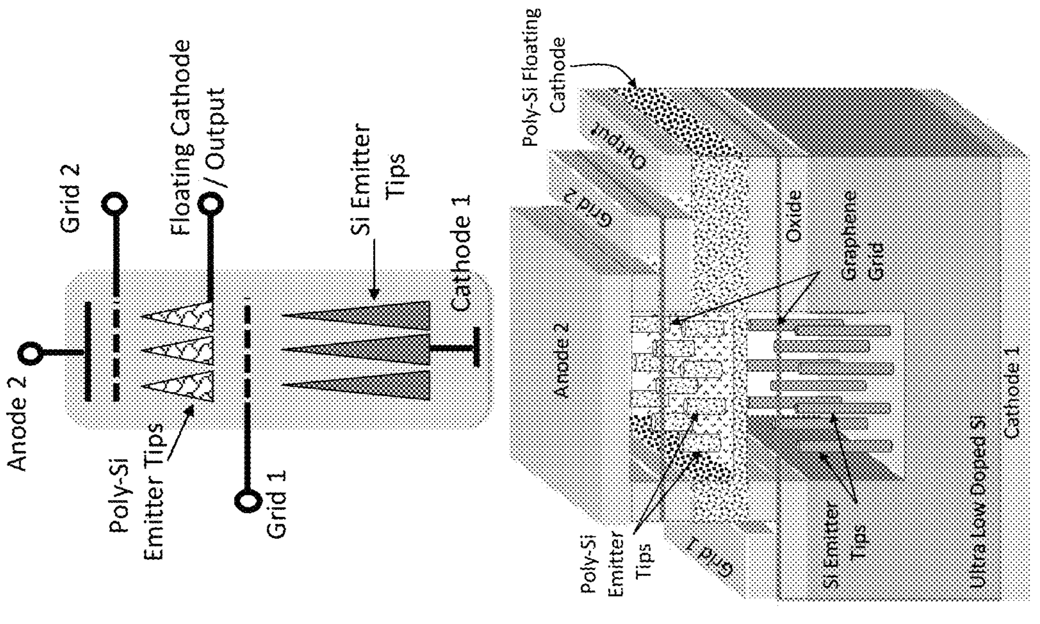
FIG. 5b1
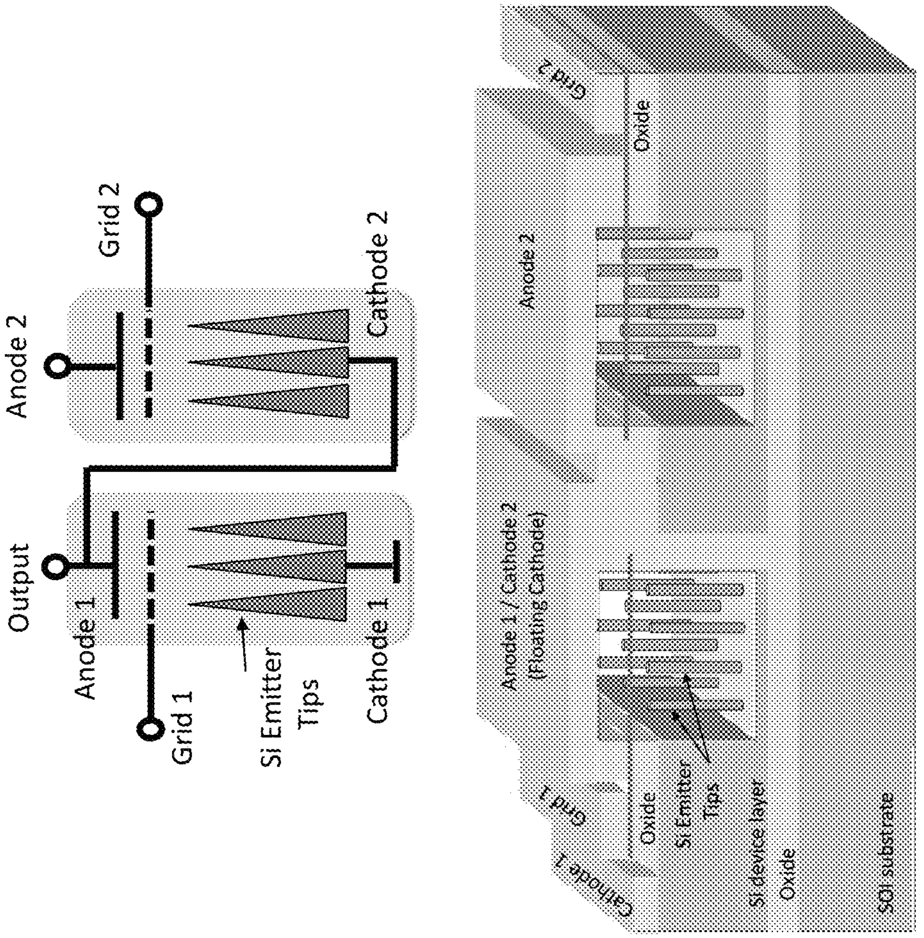
FIG. 5b2

Self-Assembly method for fabrication of field emission devices

SILICON-BASED VACUUM TRANSISTORS AND INTEGRATED CIRCUITS

CROSS-REFERENCE TO RELATED APPLICATIONS

The present patent application is a continuation of U.S. Non-Provisional patent application Ser. No. 17/701,298, filed Mar. 22, 2022, now patented as U.S. Pat. No. 11,749,487 to Mohammadi et al., which is related to and claims the priority benefit of U.S. Provisional Patent Application Ser. No. 63/164,169 filed Mar. 22, 2021, the contents of each of which are hereby incorporated by reference in its entirety into the present disclosure.

STATEMENT REGARDING GOVERNMENT FUNDING

This invention was made with government support under ECCS 1450506 awarded by the National Science Foundation and under FA9550-19-1-0349 awarded by the Air Force Office of Scientific Research. The government has certain rights in the invention.

TECHNICAL FIELD

The present disclosure generally relates to vacuum transistors, and in particular, to field-emitter arrays.

BACKGROUND

This section introduces aspects that may help facilitate a better understanding of the disclosure. Accordingly, these statements are to be read in this light and are not to be understood as admissions about what is or is not prior art.

Field Emitter Arrays (FEAs) belong to a class of electronic devices that can provide large-scale sources of electrons. The original FEA was based on an array (the Spindt's array) in which small sharp molybdenum cones formed individual field emitters. Since then, a Spindt's FEA is formed of various metals such as molybdenum (Mo) or a semiconductor material such as silicon (Si), formed as micro- or nano-tips periodically over a substrate. The reason for the name is that these microtips emit electrons and can be fabricated on a large scale. The emitted electrons migrate to an anode thereby generating an electric current as electron beam generators. For example, in a vacuum transistor, electrons accelerate from zero velocity at the tip of the cathode and reach very high velocity when they strike the anode.

FEAs are fabricated using both top-down (e.g., Spindt tips) and bottom-up (e.g., growth of vertical nanowires) approaches. Despite well-controlled processes utilized in both approaches, there are variations in tip sharpness of FEAs defined by an angle ($\vartheta$). This tip sharpness results in significant variations (e.g., orders of magnitude) in tip emission current for small variations in $\vartheta$ as shown in FIG. 1*a*, which is a complex graph of tip current in A vs. tip sharpness in degrees (the acute angle is $2\vartheta$), for different average electric fields (1 V/μm, 2 V/μm, and 3 V/μm). For example, for a small change in tip sharpness (e.g., of about 0.1875, from about 0.75 to 0.94 degrees of tip sharpness, for an average electric field of 2 V/μm), the current changes from $5\times10^{-9}$ A to about $10^{-12}$ A. The main reasons for such large variations in the emission current are (i) the exponential relationship between the tip current and the local electric field at the vicinity of the tip as predicted by Fowler-Nordheim quantum mechanical tunneling and (ii) the local electrical field enhancement in the vicinity of the tip caused by the tip sharpness. Therefore, in the majority of FEAs fabricated to date, there is a large variation in tip sharpness and their currents, which leads to a small overall current density of such FEAs. On the other hand, sharp FEA tips that also have large aspect ratios (length/diameter) have considerably large thermal resistances. With higher currents (hence, higher thermal dissipation) and larger thermal resistances, sharp tips heat up. An increase in the tip temperature leads to even a higher current as predicted by the Fowler-Nordheim equation (thermal field emission in semiconductors, where current density J is proportional to square of absolute temperature T). The excessive current due to the positive feedback caused by the temperature rise leads to the eventual burnout of sharp tips. Another reason for current variation of sharp tips is the fact that large local electric fields in the vicinity of sharp tips facilitate ions that may exist in the vacuum environment to accelerate and hit the tips. This ion bombardment directed towards sharp tips degrade them leading to degradation of their current. Therefore, FEAs fabricated to date lack reliability characteristics needed for implementing in various electronic applications, e.g., vacuum electron devices.

Therefore, there is an unmet need for a novel approach to reduce large current variations due to small variations of tip geometry in FEAs.

SUMMARY

A field emitter array (FEA) vacuum transistor is disclosed. The FEA includes a substrate and a plurality of nanorods formed of a first polarity dopant on the substrate.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 5*b*1 and 5*b*2 are schematics of two embodiments of the floating cathode field emitter triodes according to the present disclosure.

DETAILED DESCRIPTION

Figure 1A:
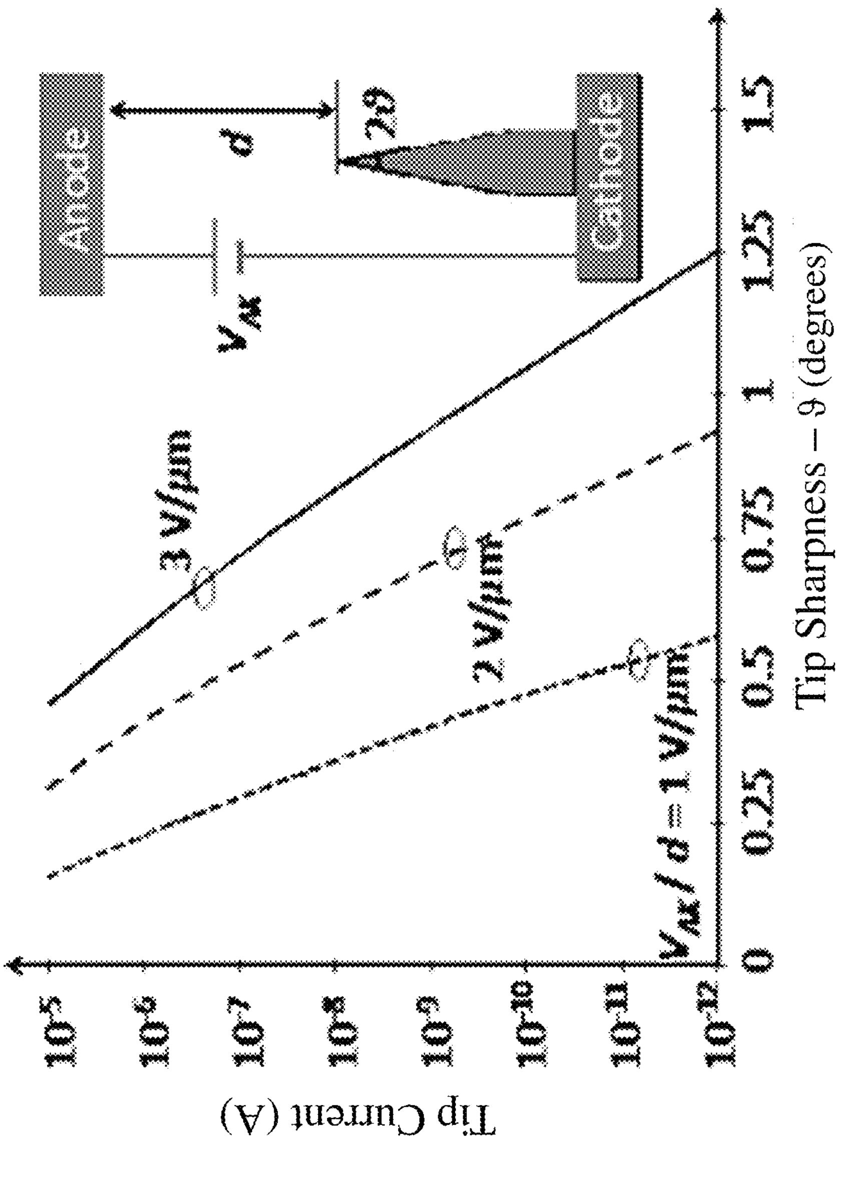
FIG. 1*a* is a complex graph of tip current in A vs. tip sharpness in degrees for different average electric fields (1 V/μm, 2 V/μm, and 3 V/μm) depicting issues in field emitter arrays (FEAs) and significant variations (e.g., orders of magnitude) in tip emission current for small variations in tip sharpness of FEAs defined by an angle $\vartheta$.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or a stated limit of a range.

In the present disclosure, the term "substantially" can allow for a degree of variability in a value or range, for example, within 90%, within 95%, or within 99% of a stated value or of a stated limit of a range.

Figure 1B:
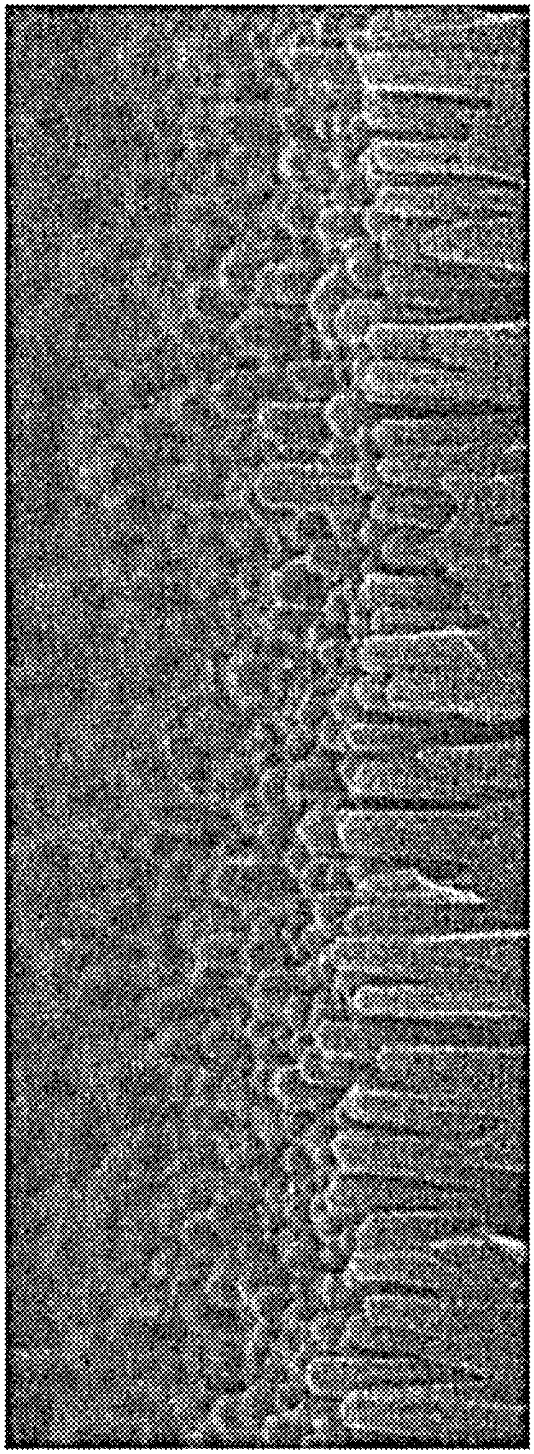
FIG. 1*b* is a scanning electron microscope photograph showing large-scale nanorods with different tip geometries.
Figure 1C:
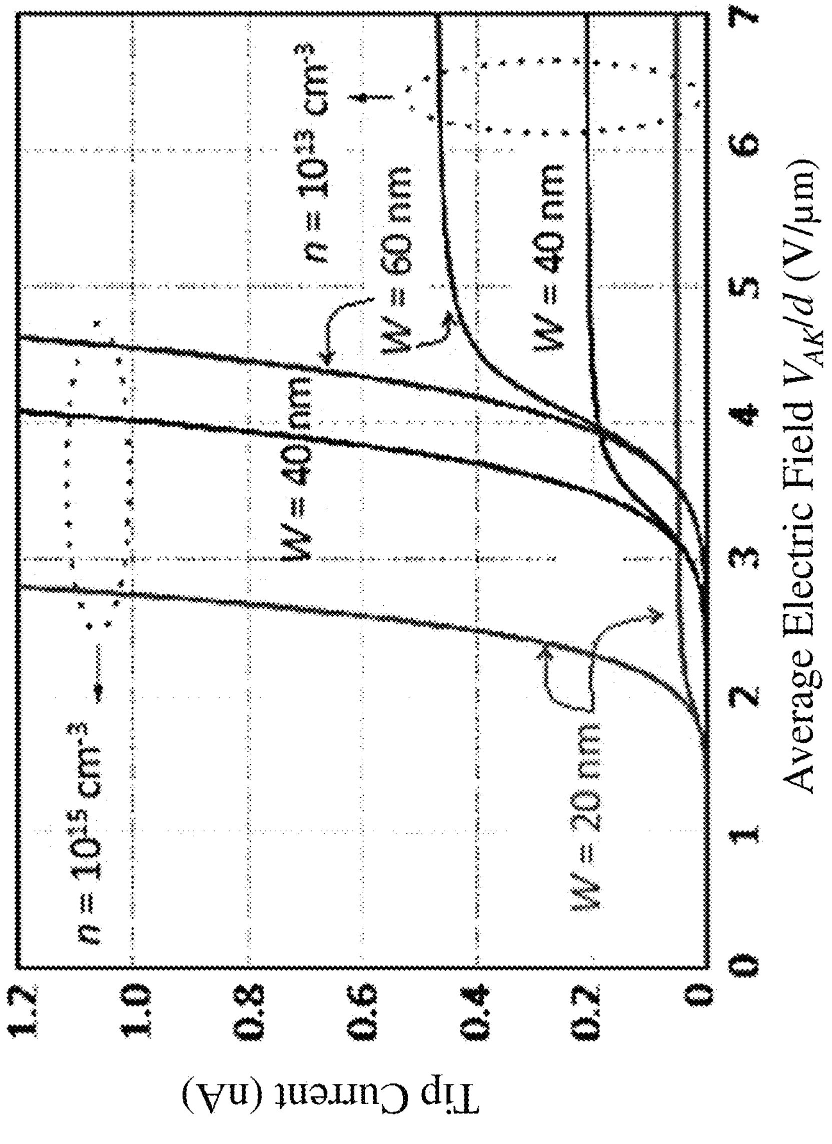
FIG. 1*c* is a complex graph of tip current in nA vs. average electric field $V_{AK}/d$ in V/m, where $V_{AK}$ is the anode-cathode voltage and d is the distance between the tip and the anode which provides graphs at different nanotips width Ws (in nm) for different dopant levels.

A novel approach is presented to reduce large current variations due to small variations of tip geometry in field emitter arrays (FEAs). This novel approach addresses both low current densities and poor reliability characteristics. To better elucidate the issue of tip geometry variations, reference is made to FIG. 1*b*. FIG. 1*b* is a scanning electron microscope photograph showing large-scale nanorods with different tip geometries. The current variations due to variations in tip geometries can be suppressed in by limiting the source of electrons available to each field emitter to achieve the same current density from each tip. The current limitation is accomplished by the velocity saturation effect in each field emitter device. A device simulation (SYNOPSYS SENTAURUS) in FIG. 1*c* is provided at relatively low Si doping densities of about $10^{13}$ $cm^{-3}$, current deviates from Fowler-Nordheim characteristic as applied electric field increases. FIG. 1*c* is a complex graph of tip current in nA vs. average electric field $V_{AK}/d$ in V/m, where $V_{AK}$ is the anode-cathode voltage and d is the distance between the tip and the anode. FIG. 1*c* provides graphs at different nanotips width Ws (in nm) for different dopant levels. Velocity saturation at low doping densities limits the current density of each tip to a constant value of $J_n=qnv_{drift}$, where n is the doping density and $v_{drift}=10^7$ cm/S for Si. The current remains constant despite variations in length or sharpness of the tip (tip length L should be long enough to observe velocity saturation in Si). FIG. 1*b*, referred to above, shows a fabrication technology for field emitters based on self-assembly. In this technology surface-treated Silica ($SiO_2$) nanospheres are assembled as a monolayer on the surface of a Si wafer using a Langmuir-Blodgett (LB) deposition technique.

These nanospheres are then used as a masking layer for a deep reactive ion etching (DRIE) of Si to form sharp Si field emitter tips with diameters having a range of about 20 nm to about 300 nm and according to one embodiment about 150 nm and a length having a range of about 0.5 μm to about 20 μm and according to one embodiment about 1 μm. With a field emitter packing density of η of about 70% achieved in this process, leading to a maximum field emission current density of $J_{emit}=\eta\times qnv_{drift}$ of about $0.7\times1.6\times10^{-19}\times1\times10^{13}\times10^7=11.2$ $A/cm^2$. Based on an actual reduction to practice, a relatively large Si emission current density of 4.6 $A/cm^2$ has been demonstrated at a modest applied electric field of about 16 V/μm and Von of about 12 V from an ultra-low-doped Si FEA ($1\times10^{13}$ $cm^{-3}$) with a large emitter area indicating the validity of this approach.

Figure 7A:
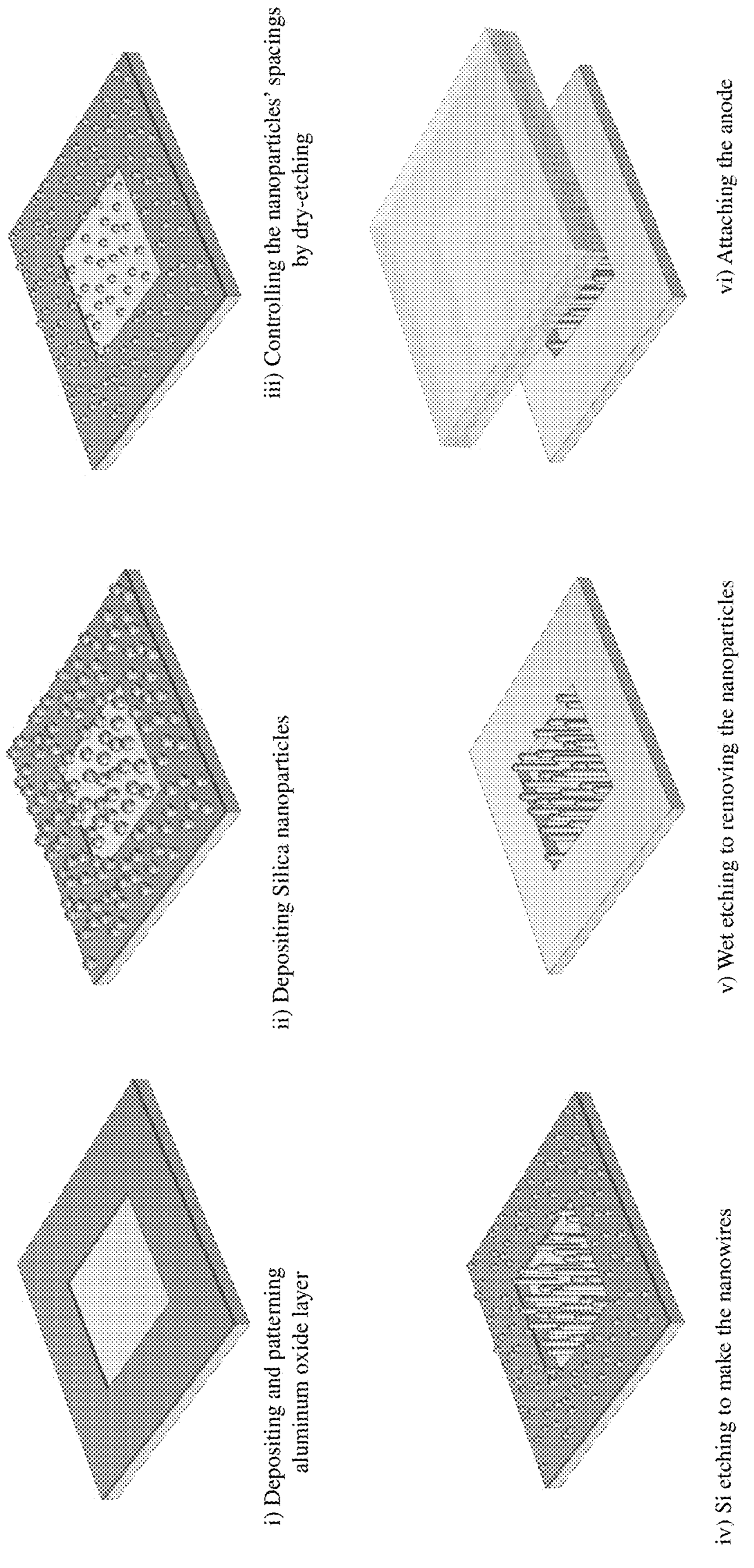
FIG. 7*a* is a fabrication process for field emission devices of the present disclosure, according to one embodiment, where an aluminum oxide layer is initially patterned and deposited on a Si or SOI substrate (Cathode) forming a well.
Figure 7B:
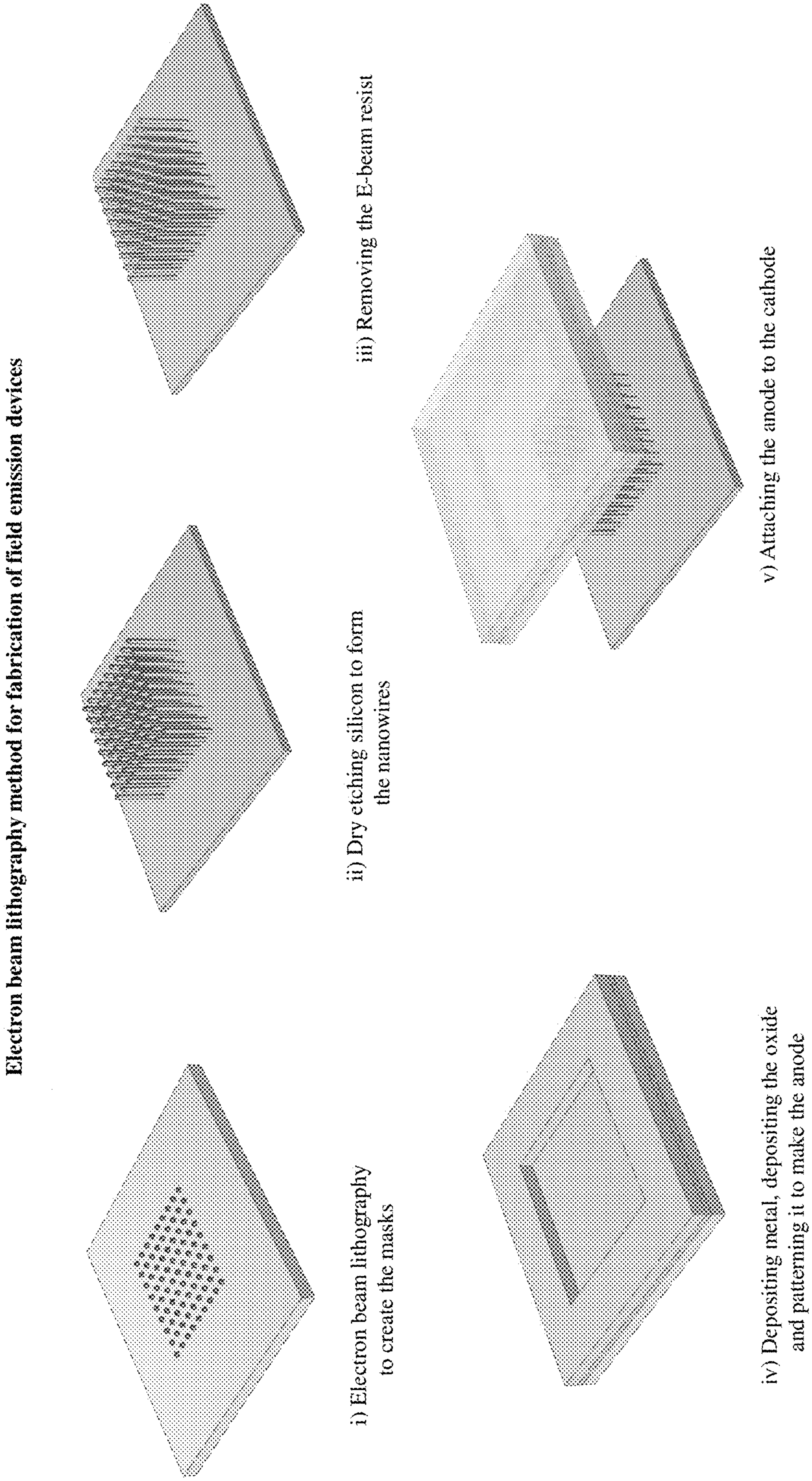
FIG. 7*b* is a fabrication process for field emission devices of the present disclosure, according to another embodiment, where an electron beam lithography process is used for the fabrication of the FAEs of the present disclosure; initially, electron beam lithography is used to generate a mask atop a Cathode substrate (Si or SOI substrate) including an e-beam resist followed by a dry-etching process to generate the nanowire/nanorods, as well as other steps.

Nanoscale Si FEAs are fabricated by vertical etching of epitaxial Si using two different approaches. In the first approach, a direct-write high-speed lithography with patterns as small as 6 nm can be used to etch Si and SiGe field emitter tips for small size vacuum transistors, digital applications as well as memory applications. In the second approach, self-assembly using LB deposition of Silica nanospheres can be used to make a masking layer for dry etching of Si and SiGe field emitter tips. Referring to FIGS. 7*a* and 7*b*, discussed further below, a fabrication process is depicted for the aforementioned Si FEAs. Device miniaturization shall yield higher current densities (of about 50 $A/cm^2$) and small turn-on voltages $V_{on}<5$ V. Further improvement will be achieved by bandgap engineered Si/SiGe tips to induce drift field.

Figure 1D:
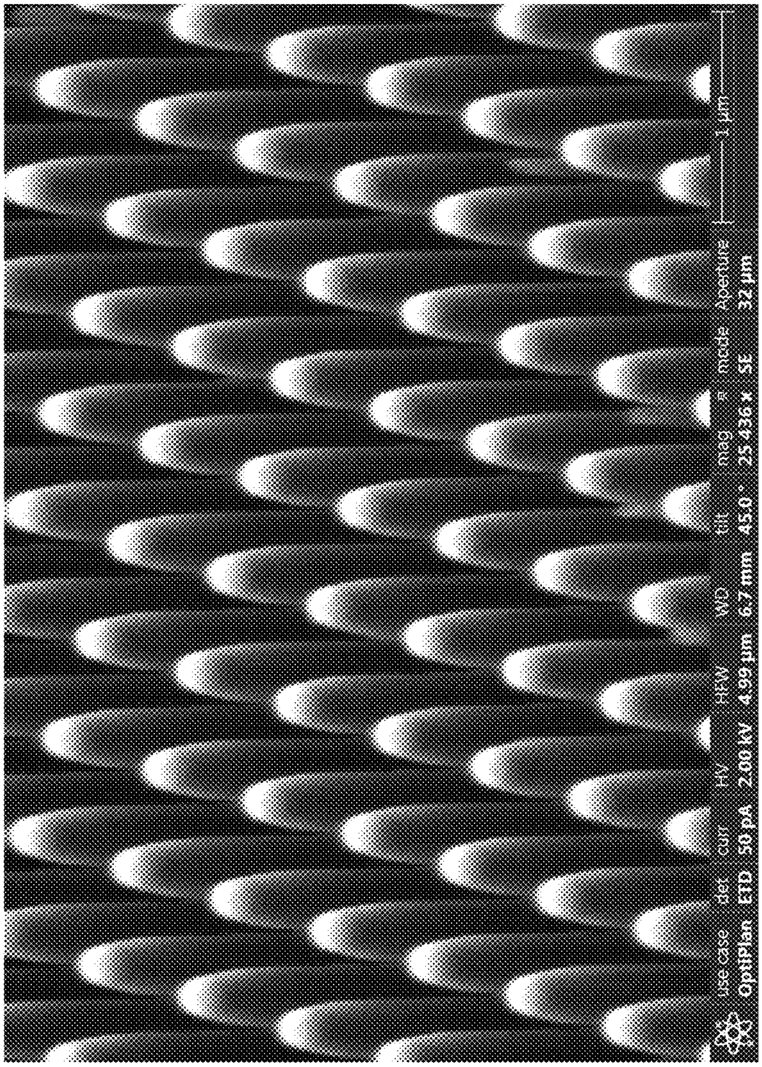
FIG. 1*d* is a scanning electron microscope photograph showing large-scale nanorods fabricated with e-beam lithography, according to the present disclosure.

The variation in tip geometries is partially due to variations in the size of Silica nanospheres used in the LB technology. Alternatively, an electron beam (e-beam) assisted fabrication process can be used to fabricate nanotips with much smaller geometrical variations. FIG. 1*d* is a scanning electron microscope photograph showing large-scale nanorods fabricated with e-beam lithography. While tip geometry variation is reduced, there may be still large variations in the current of the nanotips for a dense FEA. Current values of the side nanotips at the edges of the FEA may be much higher than those of the nanotips in the center of the array.

Figure 2A:
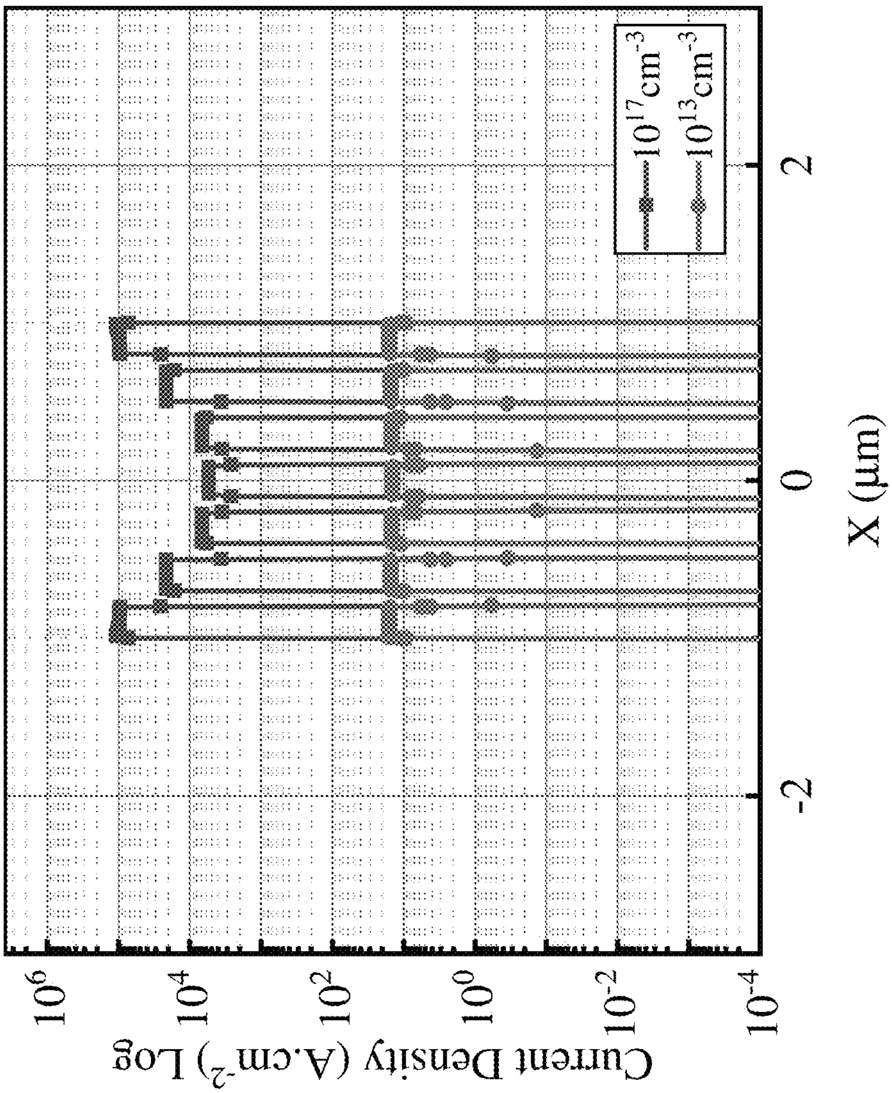
FIG. 2*a* is a graph of current density in A/cm$^2$ in log scale vs. X-axis in μm which represents the current density for an array size of 7 nanotips, where they are equally distributed over the X-axis with a space of 300 nm.

Another advantage of using a relatively low doped Si substrate is to make denser arrays. In order to make dense reliable field emitter nanotip arrays, it is essential to design the device such that all of the nanotips emit the current with similar densities. Otherwise in a dense array, most of the current is generated from the side nanotips at the edges of the FEA, which results in their tips erosion and gradual failure of the device. One solution to overcome the non-uniformity of the currents in nanotips is to fabricate the nanotips with larger distances. However, that leads to increasing the device area and reducing overall current density, which is not only costly but also inefficient. Another way to make the nanotips generate equal currents is to employ a lower doped Si substrate. FIG. 2*a* is a graph of current density in A/cm$^2$ in log scale vs. X-axis in μm which represents the current density for an array size of 7 nanotips, where they are equally distributed over the X-axis with a space of 300 nm. For the relatively high doped ($10^{17}$ cm$^{-3}$) array, the current density of the periphery nanotips is more than 50 times of the middle nanotips. This effect leads to deconstruction of the periphery nanotips and gradual system failure. This is while for a low doped ($10^{13}$ cm$^{-3}$) dense field emitter array, the generated current density is almost equal from all tips.

Figure 2B:
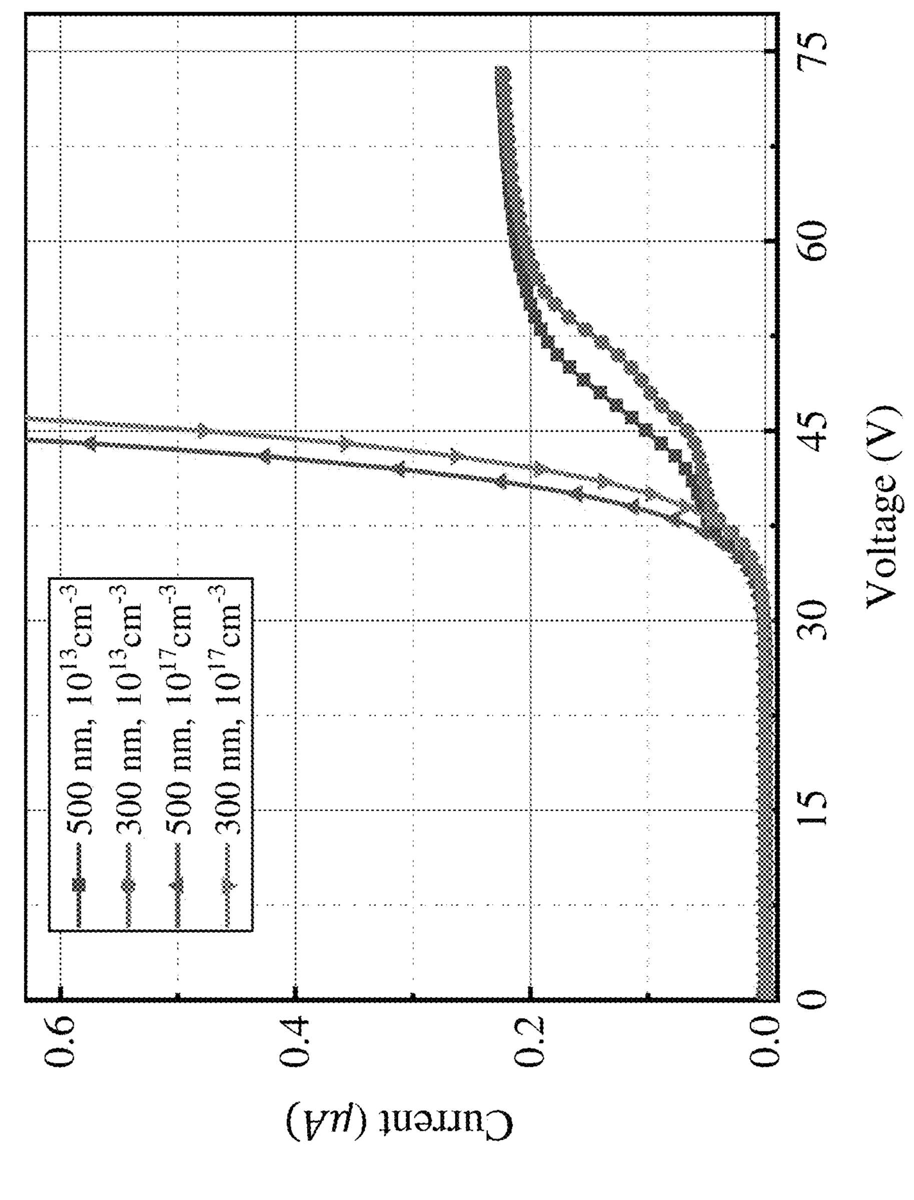
FIGS. 2*b* (a graph of current in μA vs. voltage in V) and 2c (a graph of current density in A/cm$^2$ in log scale vs. X-axis in μm) show that by increasing the space of the nanotips from 300 nm to 500 nm, the difference between the current density of the periphery and middle nanotips reduces.
Figure 2C:
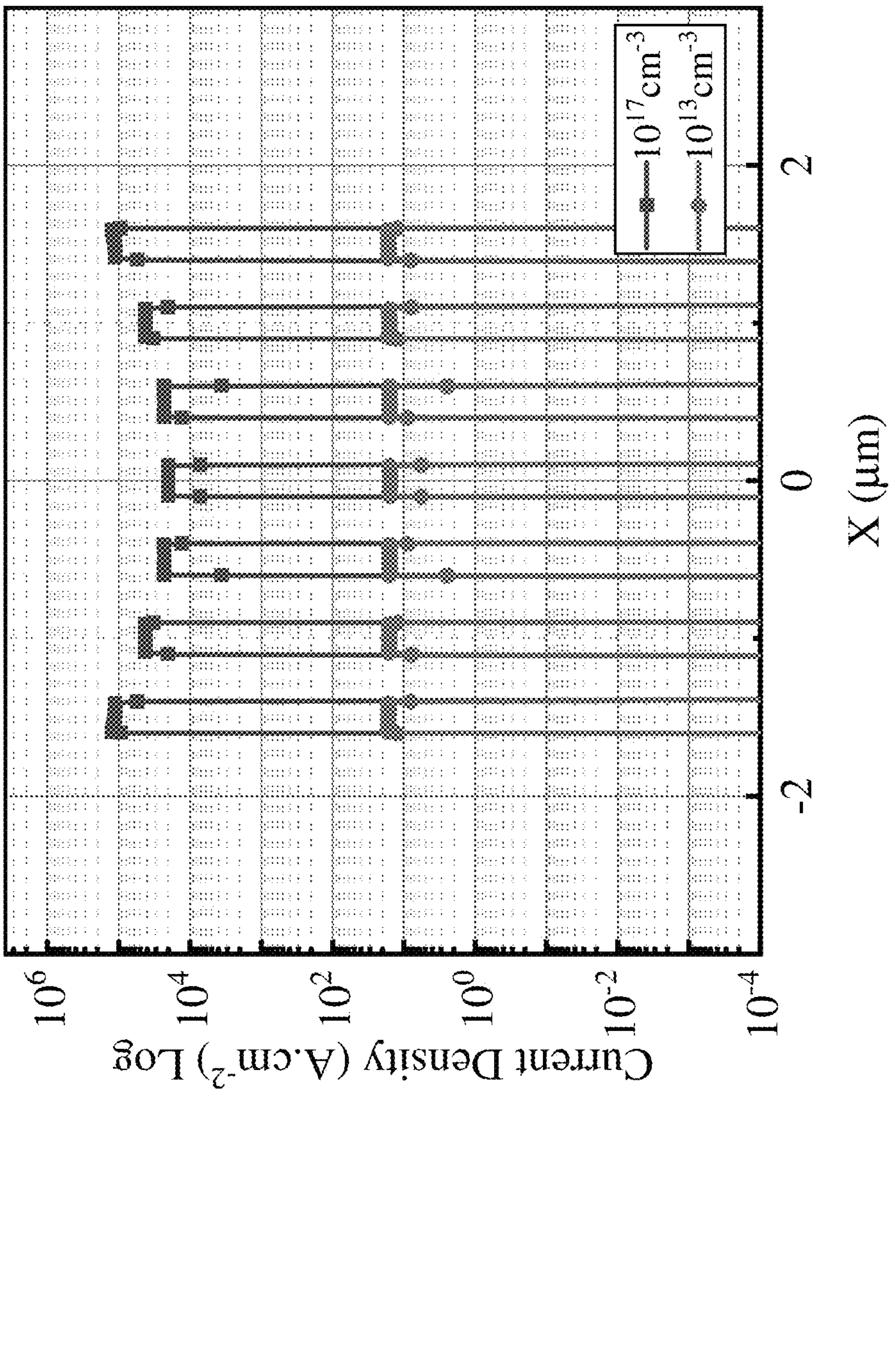

FIGS. 2*b* (a graph of current in μA vs. voltage in V) and 2c (a graph of current density in A/cm$^2$ in log scale vs. X-axis in μm) show that by increasing the space of the nanotips from 300 nm to 500 nm, the difference between the current density of the periphery and middle nanotips reduces but compared to a low doped Si array, there is still a huge difference. Thus, by having a low doped Si substrate, the density of nanotips can be increased while all of them emit at the same current density. This method results in more reliable and efficient devices.

Figure 3A:
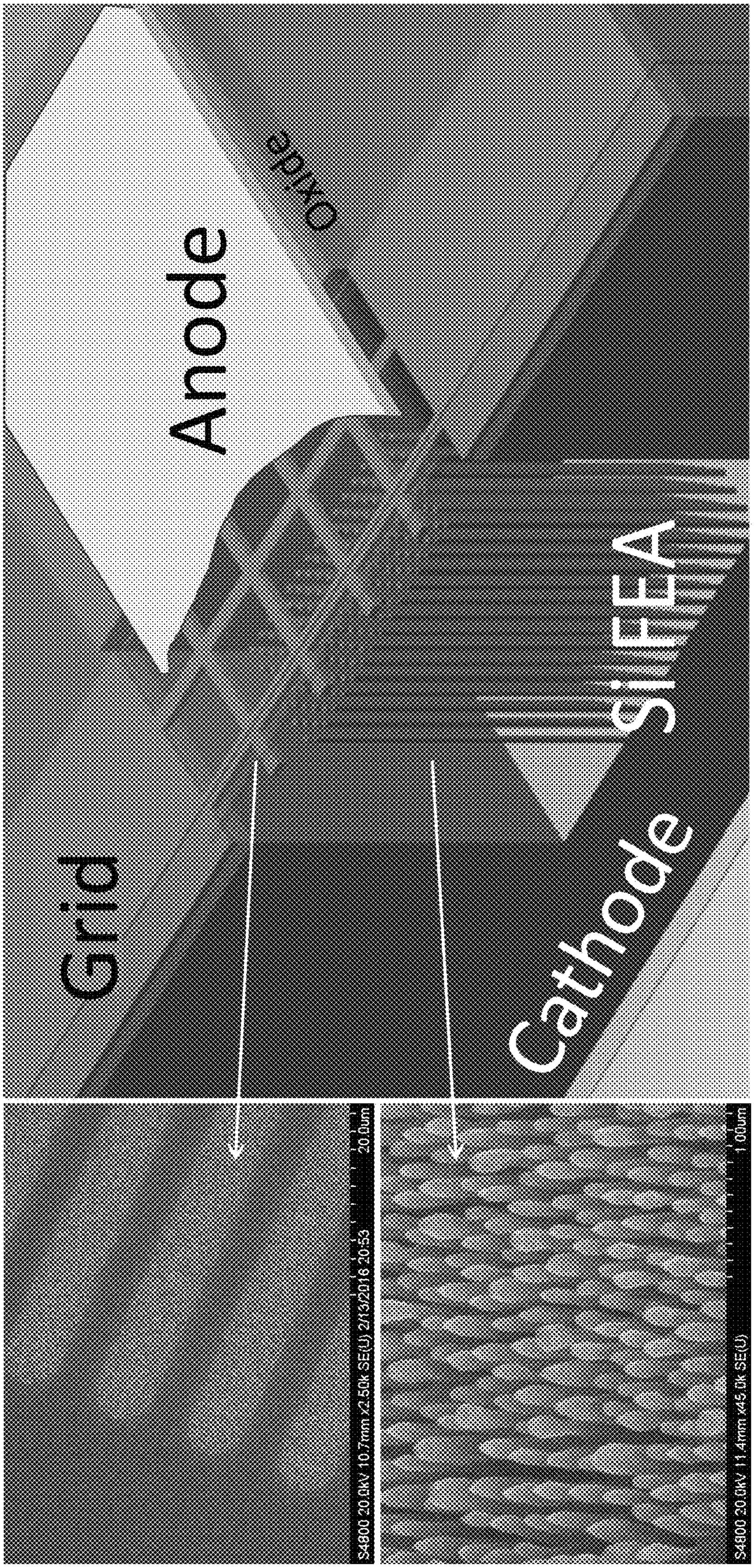
FIG. 3*a* is a schematic of a three-terminal Triode vacuum transistor with a mesh-type grid fabricated over Si FEAs provided as a showing of the actual reduction to practice of the novel arrangement of the present disclosure.
Figure 3B:
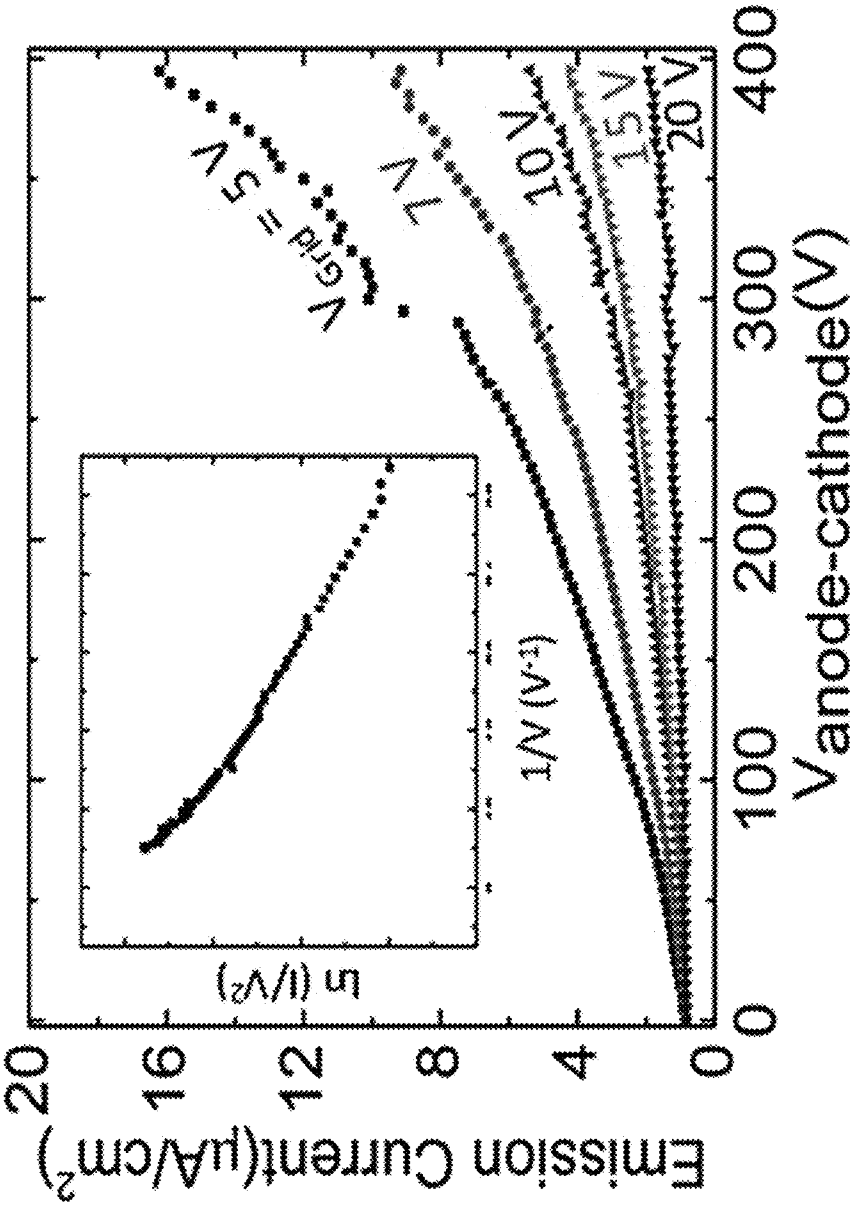
FIG. 3*b* is a complex graph of emission current density in $\mu A/cm^2$ is provided vs. $V_{anode-cathode}$ in V for different $V_{Grid}$ levels as shown in FIG. 3*a* (i.e., voltage applied on the grid (gate)), measuring I-$V_{AK}$ characteristics of the device.

Referring to FIG. 3*a*, a schematic of a fabricated vacuum triode is provided. Insets show SEM images of the Si-based FEA, patterned cathode using an Atomic Layer Deposited (ALD) process using $Al_2O_3$ and Al Grid. The SEMs are taken before capping the device with Anode metal. FIG. 3*a* thus depicts a schematic of a three-terminal Triode vacuum transistor with mesh-type grid fabricated over Si FEAs provided as a showing of the actual reduction to practice of the novel arrangement of the present disclosure. Referring to FIG. 3*b* a complex graph of emission current density in μA/cm$^2$ is provided vs. $V_{anode\text{-}cathode}$ in V for different $V_{Grid}$ levels (i.e., voltage applied on the grid (gate)), measuring I-$V_{AK}$ characteristics of the device. The Anode metal cap is 20 μm away from the Grid. The device is measured inside a vacuum chamber. Shown in FIG. 3*b* are measured dc characteristics of the vacuum transistor which show relatively high transconductance. Further optimization of grids including Graphene Grid and sub-micron anode-cathode gap provide the full potential of these devices. It is also possible to make such devices and circuits on a standard nano-scale CMOS technology followed by a post-CMOS etching process that carves out the vacuum device.

Figure 4B:
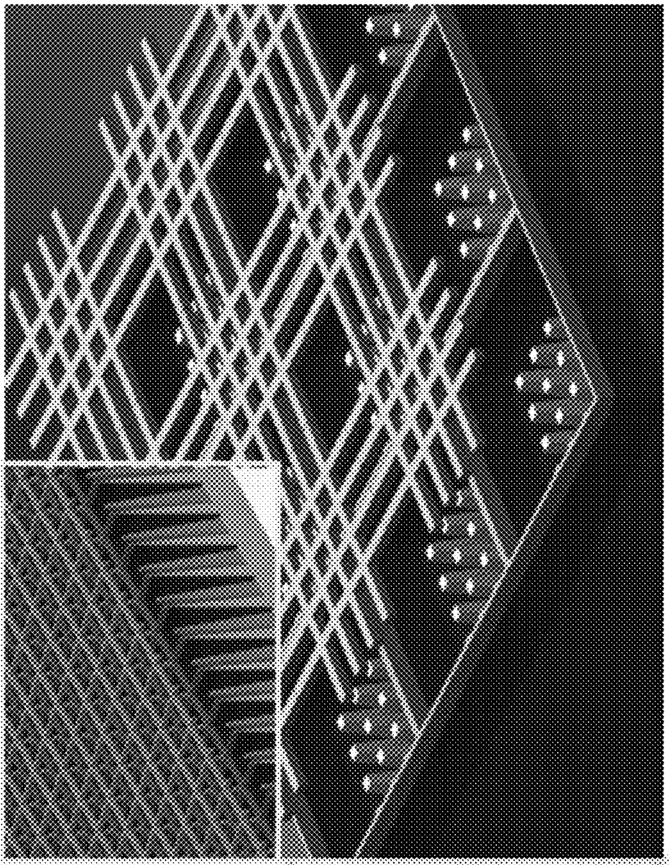
FIG. 4*b* is a schematic design of the post-CMOS fabricated vacuum triode and tetrode are and further shown with more clarity in the inset.
Figure 4A:
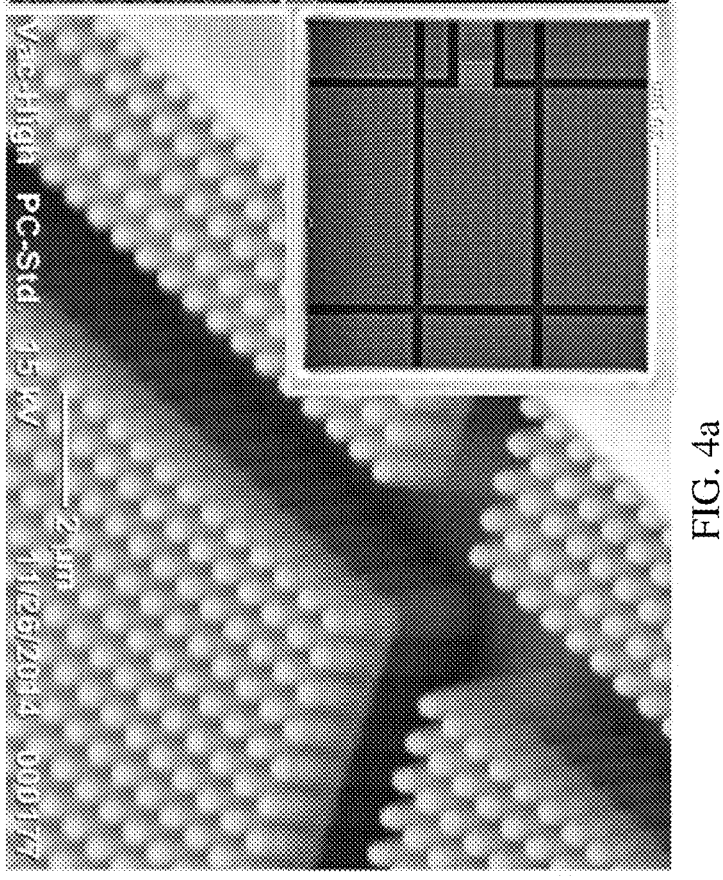
FIG. 4*a* is a scanning electron microscope (SEM) image of the fabricated FEA in a standard 45 nm CMOS technology with inset showing a zoomed-out SEM image of the same structure.

Referring to FIG. 4*a*, a fabricated CMOS-based FEA is shown that has gone through a simple mask-less post-CMOS dry etching processing. In particular, FIG. 4*a* is a scanning electron microscope (SEM) image of the fabricated FEA in a standard 45 nm CMOS technology. Inset shows a zoomed-out SEM image of the same structure. Schematic design of the post-CMOS fabricated vacuum triode and tetrode are shown in FIG. 4*b* (shown with more clarity in the inset). In this process, metal islands in the lowest metallization layer of the process (M1) are used as masks for deep reactive ion etching (DRIE) of the Si substrate. The technology used is a standard GLOBALFOUNDRIES 45 nm CMOS SOI process with metal islands as small as 70 nm×70 nm. With the availability of high resistivity Si substrate in the process, Si FEA devices in this technology are expected to have high current density and be reliable. The availability of several metal layers that can serve as multiple grids and anode with unparalleled fabrication precision allows building high-performance analog and digital vacuum transistors and circuits in this technology.

With this novel approach to FEAs, mm-wave to THz applications of vacuum transistors are thus within reach. As discussed above, in a vacuum transistor, electrons accelerate from zero velocity at the tip of the cathode and reach very high velocity when they strike the anode. Assuming that the velocity of electrons at the anode terminal is only 1% of the speed of light ($v_e=3\times10^6$ m/s), the transit time for vacuum transistors with an Anode/Cathode separation of $d_{AK}$ of about 0.5 μm is about $3.3\times10^{-13}$ Sec. The maximum cut-off frequency $f_T$ for such a device is therefore in the order of 1 THz. The cut-off frequency is limited by various parasitic capacitances of the device and a more accurate estimation of the cut-off frequency is shown in the following equation:

$$\frac{1}{2\pi f_T} = \frac{C_{KG}}{g_m} + C_{AG}\left(\frac{1}{g_m} + R_A + R_{AK}\right) + \frac{2d_{AK}}{v_e} \quad (1)$$

where $g_m$ is the device transconductance, $C_{KG}$, $C_{AG}$ are cathode-grid and anode-grid capacitances, respectively, and $R_K$ and $R_A$ are series resistances of cathode and anode, respectively. For an optimized device with 0.5 μm Anode/Cathode separation, the practical cut-off frequency is in sub-THz range but still much higher than those of advanced CMOS nanoscale technologies. Therefore, mm-wave and THz vacuum transistors with high levels of output power can be easily achieved with this technology. This aspect of this novel arrangement of FEAs is suitable for applications in satellite communications and radars.

Thus, according to the present disclosure, an FEA is disclosed with a dopant density of about $10^{13}$ cm$^{-3}$ to about $10^{15}$ cm$^{-3}$. The dopant is for example an N-dopant. This level of dopant allows a more reliable uniformity of current in nanotips even with small tips center-to-center distance of between about 300 nm to about 500 nm resulting in a current density of about 50 A/cm$^2$.

Figure 5A:
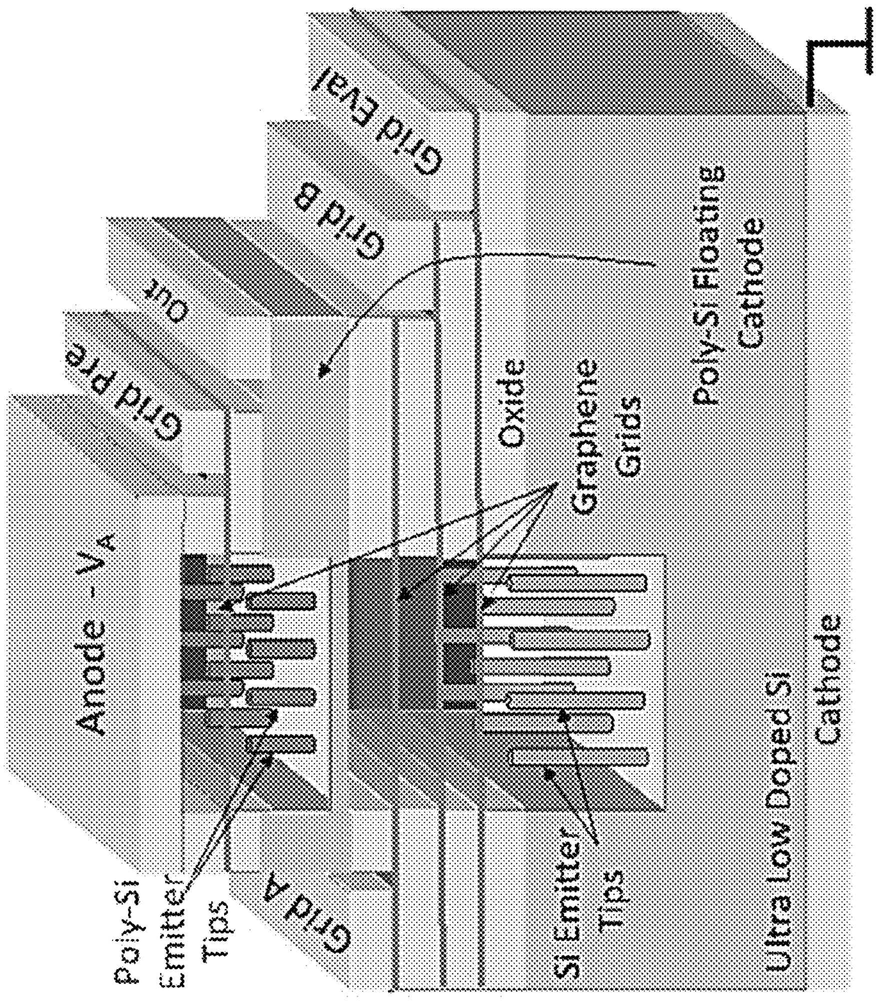
FIG. 5*a* is a schematic of an application of the FEA of the present disclosure as digital circuit implementations: a floating cathode field emitter (FCFE) logic technology with a compact 3D structure.

Several different applications are now discussed for the FEAs of the present disclosure. The first one is an application for digital circuit implementations. A floating cathode field emitter (FCFE) logic technology with a compact 3D structure is shown in FIG. 5*a*. The structure has a top Anode metal, a Si field emitter cathode, and an un-doped poly-Silicon floating cathode that serves as both Cathode and Anode, depending on the mode of operation. Grid structures (upper and lower grids) are also shown. The fabrication of the structure starts with ultra-low doped Silicon epitaxy followed by emitter tip formation using either an e-beam lithography or the self-assembled Silica deposition/etching technology. A low-temperature sacrificial oxide film is next deposited to fill the gaps among FEA tips. Chemical mechanical polishing (CMP) is used to achieve a flat surface for further processing. Next grid deposition (either metal or Graphene) is performed followed by the deposition of another low-temperature thin oxide layer. The process of Grid layer/Oxide layer deposition is repeated several times to achieve a structure with multiple grids (A, B, and Eval). Then an un-doped thick poly-Si layer (of about 1 μm) is deposited and patterned. Field emitters are formed on the patterned Poly-Si islands to form the floating cathode (Out terminal). Another low-temperature oxide deposition followed by another CMP process is performed before the top grid deposition (Pre). Finally, Anode metal is deposited and all the sacrificial oxide layers are etched from the top and two sides of the structure.

Two embodiments of the floating cathode field emitter triodes are shown in FIGS. **5*b*1 and 5*b*2. For simplicity two triodes (3-terminal vacuum transistor) each with only one Grid (Gate) are shown in these embodiments. In each case, two triodes are cascaded where the anode of one triode is connected to the cathode of the next device to implement the floating cathode structure. The left figures show the formation of the two triodes using a standard Si substrate with stacked triodes similar to the implementation described in FIG. 5*a***. In this case the first triode (bottom) is implemented with Si field emitters from the Si substrate while the second triode (top) is fabricated by forming a Poly-Si layer into nanotips. The second embodiment uses a Silicon on Insulator (SOI) substrate to implement the two triodes side by side. In this case both triodes are implemented with Si field emitters from the Si substrate. The two devices are electrically isolated from each other using buried oxide layer of SOI substrate (Oxide layer between Si substrate and Si device layer) and also by using trench oxide which is formed around the two devices.

Another alteration in the process is achieved by using a SOI substrate for the anode implementation as shown in FIG. **5*c*. The Anode layer and separation between Anode and Cathode is achieved by utilizing a Si device layer 2 and oxide layer shown in FIG. 5*c* that are slightly thicker than the height of Si field emitters formed by Si device layer 1. A cavity inside the Anode SOI layer is formed by etching Si device layer 2 and oxide layer 2**. Then the two SOI substrates are bonded together to form the vacuum transistor. The SOI-based Anode has the advantage of low leakage, well controlled Anode-Cathode distance and the possibility of vacuum packaging of the device.

Due to stacking of two vacuum transistors on top of each other, the FCFE structure is compact and has the footprint of only one vacuum transistor. The minimum size device with one field emitter tip with a diameter of 100 nm will have an active area of about 400 nm×400 nm. The bottom vacuum transistor formed between Si FEAs and un-doped poly-Si layer with multiple grids (A, B, and Eval) facilitates a digital NAND logic. The power dissipation is quite low due to the dynamic nature of the design and the role the top and bottom vacuum transistors that share the floating cathode play. The operation of the device as a low-power dynamic two-input NAND gate is shown in FIG. **5*d***. The top Anode terminal is connected to a positive voltage $V_A$. First positive voltage $V_A$ (logic 1) is applied to upper grid (Pre) causing the electrons from the floating cathode to be emitted to the anode terminal, leaving behind positively charged ions. As a result, the potential of the floating cathode (also the output terminal) rises to $V_A-V_{on}$ (pre-charge state), where $V_{on}$ is the turn-on voltage of the top vacuum transistor formed between the anode and floating cathode. After the pre-charge state, the potential on Pre is lowered to 0 V (logic 0), while the potential of the Eval grid is increased to $V_A$ (logic 1). If both inputs A and B are also high (logic 1), field emission from the lower cathode to the floating cathode starts, which in turn brings down the potential of the Out terminal to $V'_{on}$ (logic 0). $V'_{on}$ is the turn-on voltage of the bottom vacuum transistor formed between the cathode and the floating cathode. If either inputs A or B is low, the field emission process in the bottom vacuum transistor does not occur and the Out terminal potential remains high at $V_A-V_{on}$ (logic 1), hence implementing a 2-input dynamic NAND logic. When both Pre and Eval pulses are low (logic 0), the potential at the Out terminal does not change, thus implementing a latch function. The number of electrons trapped on the floating Cathode (Out terminal) does not change even upon disconnecting the power supply and removing the Anode potential $V_A$. By re-connecting the supply voltage and re-applying the Anode potential back to $V_A$, the potential at the Out terminal is brought back to the previous state before disconnecting the power supply, hence implementing a non-volatile digital logic function, which is unprecedented in CMOS digital logic technology. As long as the lower and upper grids are not activated simultaneously, there will be no DC current flowing in this structure.

Another application is a non-volatile memory. Standard non-volatile flash memory architectures work based on Fowler-Nordheim quantum tunneling from/to a floating gate structure. There is no surprise that one can accomplish the same functionality with vacuum transistors. The design and operation of a non-volatile memory cell based on FCFE architecture is shown in FIG. **5*e*** (a read-write non-volatile memory cell is shown with read and write waveforms implemented in dynamic floating cathode field emitter technology). Two FCFE structures are used to form the memory cell with a minimum cell dimension of about 800 nm×400 nm. An array of these memory cells may be formed similar to standard memory architectures with differential Set/Reset bit lines, bit read lines, bit Output lines and Word lines. To perform Write operation, first Set and Reset signals from a column decoder are provided as shown in the figure. Then Word line is activated. If Set=1 and Reset=0, then intermediate node X (storage element) is discharged to a logic 0 voltage ($V'_{on}$). If Set=0 and Reset=1, then intermediate node X is charged to a logic 1 voltage ($V_A-V_{on}$). As noted before, the data stored at node X will remain there even if the power supply is disconnected due to the lack of any leakage mechanism in this device. To perform the Read operation, the Word line is first activated. Then Bit read signal is activated. If the stored information at point X is logic 0, then the Output is charged to $V_A-V_{on}$ (logic 1). If the stored information at point X is logic 1, then the Output is discharged to a lower voltage but not exactly $V'_{on}$ or logic 0. A sense amplifier at the Output node detects the voltage deviation from the nominal value to facilitate fast Read operation. Lastly, the read operation is non-destructive.

Field emitter tips with an average active area of 40 nm×40 nm will have a tip emission current of 0.2 nA. With relatively sharp tips with 0.5 μm Anode/Cathode separation, a turn on voltage $V_{on}=V'_{on}=2$ V is expected, while applied Anode voltage $V_A$ can be as low as 5 V. The leakage current in this technology is virtually zero, leading to zero static power for the proposed FCFE digital architecture. The overall power of a minimum size dynamic invertor is therefore calculated according to:

$$P_{dyn}=f,(C_{AG}+C_{KG}),(V_A-V_{on}-V'_{on})^2 \quad (2)$$

where f is the operating frequency and the sum of anode-grid and cathode-grid capacitances ($C_{AG}+C_{KG}$ is about $10^{-19}$ F) is extracted for an anode-grid separation of 0.25 μm. The estimated dynamic power for a minimum size inverter operating at 5 GHz is about $3\times10^{-9}$ W. The energy delay product (EDP) of this technology is estimated to be an unprecedented low value of $\sim10^{-30}$ J·Sec, which is orders of magnitude lower than a minimum size inverter implemented in a nano-scale CMOS technology. The main reasons that the proposed FCFE logic has such a low EDP are the availability of the vacuum channel instead of semiconductor channel, which facilitates ultra-high speed characteristics of the vacuum transistor (ballistic transport) and its ultra-low power performance (very low capacitance and no leakage).

One important aspect of the FEA of the present disclosure is the reliability and packing of the devices. One important aspect of the present disclosure is the temperature dependence of field emission current when current is limited by velocity saturation in the semiconductor. For any semiconductor, current transport has two distinct regions with respect to the semiconductor lattice temperature. For lattice temperatures below a critical value ($T_c$), temperature increment leads to more lattice and ionized impurity scatterings. As a result, the mobility (and velocity) of electrons decreases as the temperature increases, leading to reduced current with increasing temperature. At temperatures above the critical value $T_c$, more thermally excited electrons will jump from the valance band to the conduction band, giving rise to free carrier concentration, n, and hence a higher current. In this carrier density dominated region, the current increases as the temperature increases, which in turn generates more joule heating and even higher temperature. This microscopic thermal runaway, if not controlled externally, will eventually cause a catastrophic failure of the field emitter tip. To achieve high reliability in field emitter arrays, it is essential that all emitter nanotips operate below the critical temperature $T_c$.

Figure 5C:
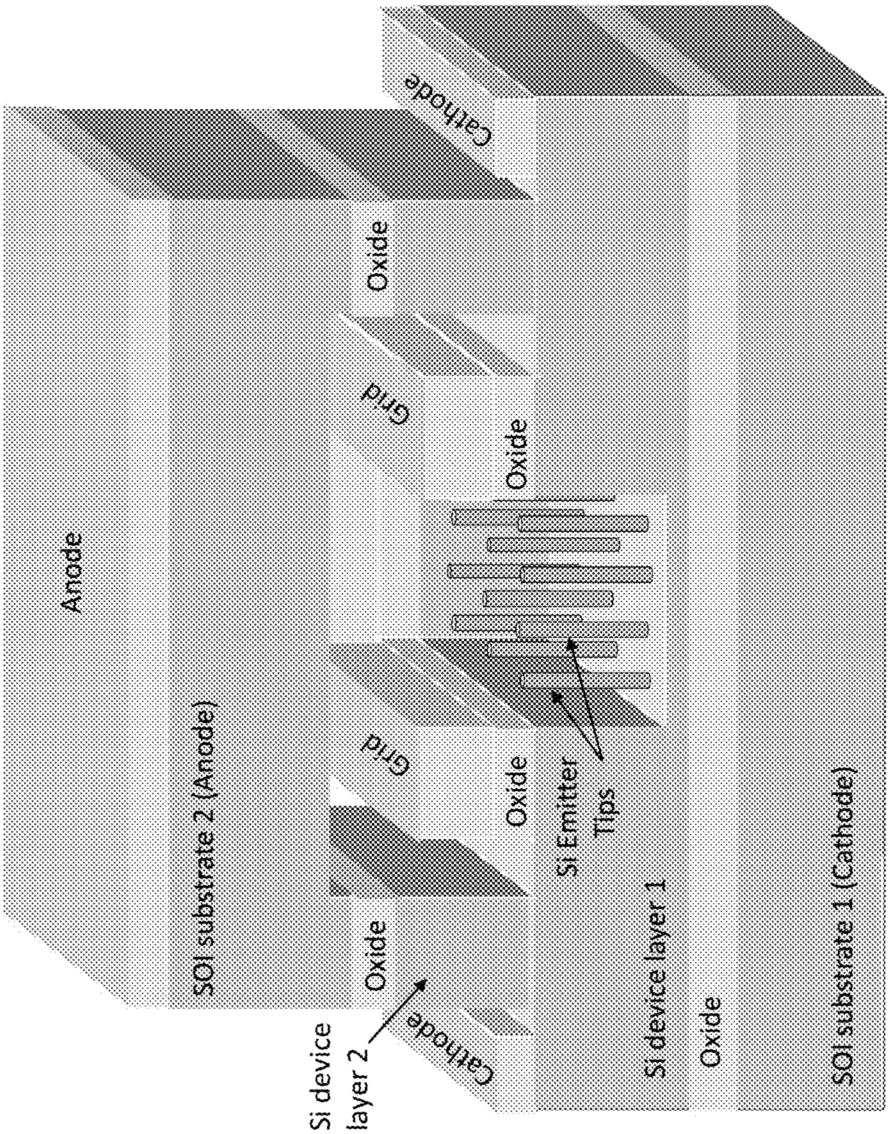
FIG. 5*c* is a schematic of another implementation of the FEA as utilizing a silicon on insulator (SOI) substrate for its anode implementation.
Figure 5D:
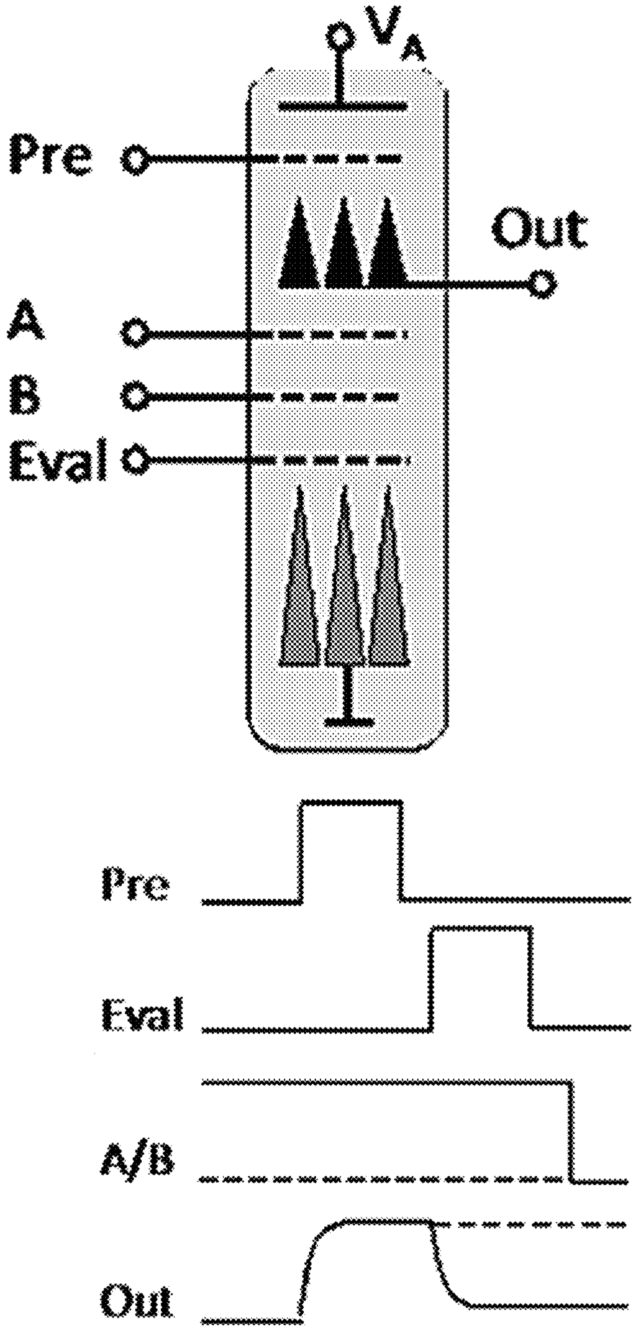
FIG. 5*d* is a timing chart showing the operation of the ice as a low-power dynamic two-input NAND gate.
Figure 5E:
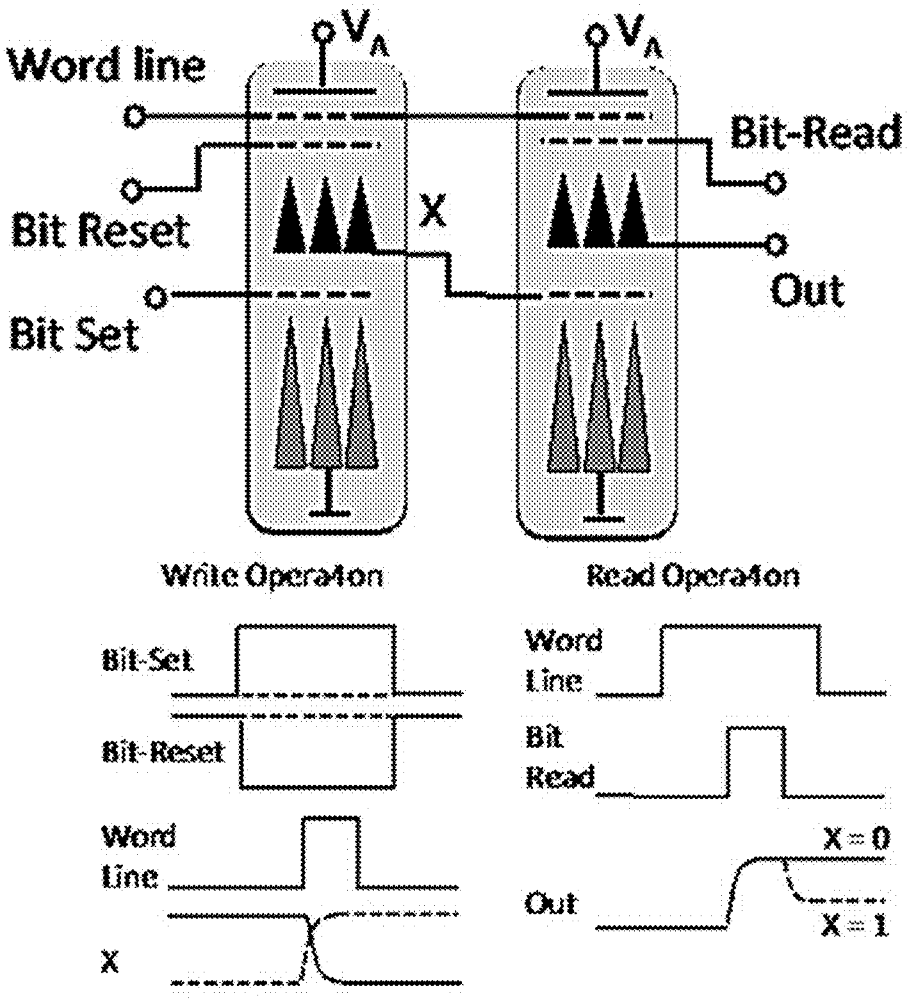
FIG. 5*e* provides timing charts for design and operation of a non-volatile memory cell based on FCFE architecture with a read-write non-volatile memory cell with read and write waveforms implemented in dynamic floating cathode field emitter technology.
Figure 6:
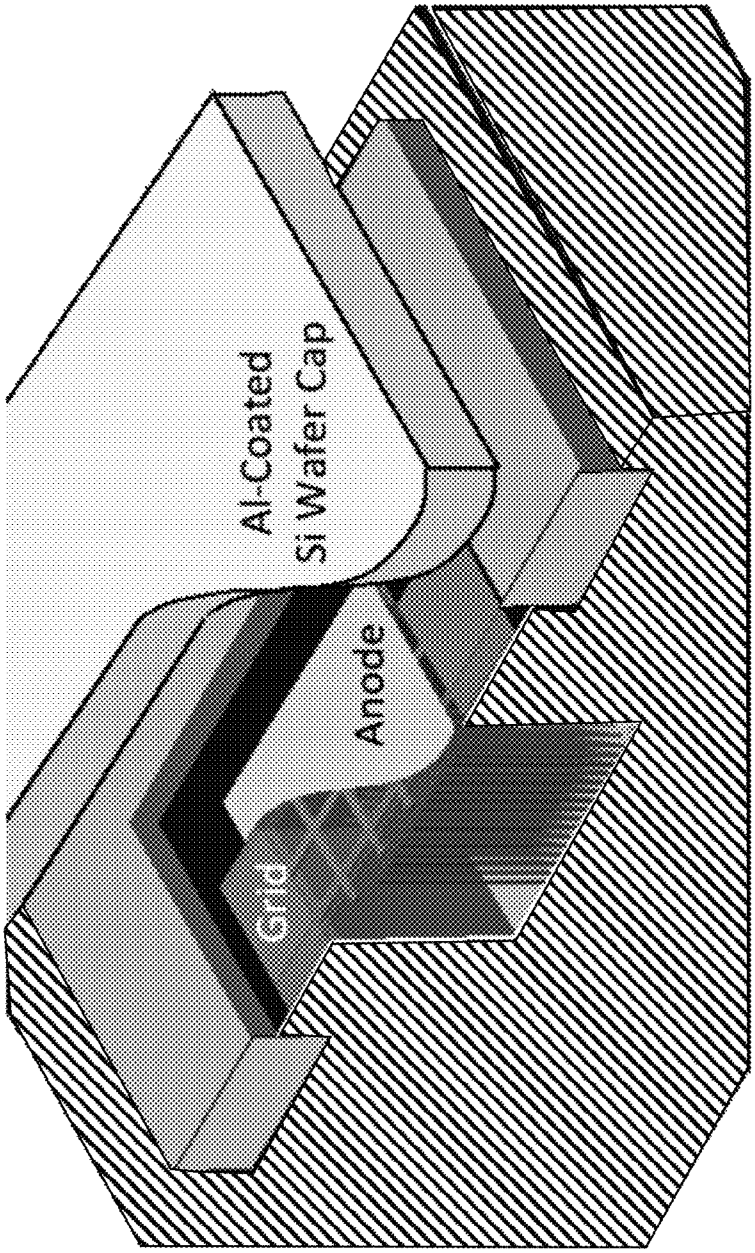
FIG. 6 is a schematic of a vacuum packaging based on solder sealing using electrodeposited solder channels.

The short gap between anode and cathode in the vacuum transistors of the present disclosure and the low operating voltage of the device relaxes the vacuum packaging requirements. The ionization probability in the proposed devices is very small, and a modest vacuum level attained by solder sealing may be enough for the vacuum packaging of the proposed vacuum transistors and integrated circuits. A simple packaging process based on solder sealing technology with extra channels to allow solder spillover is also disclosed as shown in FIG. 6 (which is a schematic of a vacuum packaging based on solder sealing using electrodeposited solder channels). Note that as discussed in FIG. 5*c*, an SOI wafer with an etched cavity can be used for Anode implementation. It should be noted that at low vacuum levels, the emission current depends on the vacuum level. Lifetime studies of the emission current at low vacuums has to be conducted to reveal the vacuum sealing of the transistor cavity.

Referring to FIG. 7*a* a fabrication process for field emission devices of the present disclosure is provided. Additionally, an electron beam lithography method is shown in FIG. 7*b* for fabrication of field emission devices of the present disclosure. In FIG. 7*a*, an aluminum oxide layer is initially patterned and deposited on a Si or SOI substrate (Cathode) forming a well. Next, silica nanoparticles are deposited. Next, utilizing a dry-etching process, the nanoparticles spacing is forced according to a predetermined spacing criterion. Next, a Si-etching process is utilized to allow formation of nanowires/nanorods. Next, a wet-etching process is utilized to remove the nanoparticles from all areas except the well. Next, the anode is formed atop the nanowires/nanorods. The Anode formation can be done by either using photolithography to make an airbidge, or by bonding Anode substrate (Si, SOI or even glass substrate with metalized Anode) to the Cathode substrate. In FIG. 7*b*, an electron beam lithography process is used for the fabrication of the FAEs of the present disclosure. Initially, electron beam lithography is used to generate a mask atop a Cathode substrate (Si or SOI substrate) including an e-beam resist. Next a dry-etching process is used to generate the nanowire/nanorods. Next the e-beam resist is removed. Next, metal is deposited and patterned to make up the anode on a separate Anode substrate (Si or Glass). Note that in this step an SOI wafer with an etched cavity can be used to make the Anode substrate. Alternatively, a photolithographic process on the Cathode substrate can be used to make an airbridge Anode. Last the anode substrate with deposited metal is placed and attached to the Cathode substrate which contains Field emitter array made of Si nanotips.

It should be appreciated that the FAE of the present disclosure can also be used in a switch. Reference is made back to FIG. 5*c*. Note that $V_{Anode\text{-}Cathode}$ must be above the turn-on voltage which is the necessary condition for electron emission from cathode to anode. There are two different operational conditions for the triode acting as a switch: 1) Switch is on when no potential is applied to the grid or when $V_{Grid}$ is smaller than a predetermined threshold value $V_t$. In this case there is a current between anode and cathode. The current value may be changed by the grid potential, which means on-resistance of the switch may change. Nevertheless, switch will stay in on-state as long as $V_{Grid}<V_t$; and 2) Switch is turned off when $V_{Grid}$ is equal or larger than the threshold voltage $V_t$. In this case there is no current between anode and cathode. There may be a small leakage current between cathode and Grid but anode current will stay at 0.

By varying process parameters of the processes shown in FIGS. 7*a* and 7*b*, various parameters of the FAE of the present disclosure can be affected. These include: 1) Base diameter of nanotips. This value is set by the fabrication technology: Range is between about 20 nm to about 300 nm, typically about 100 nm; 2) Tip diameter of nanotips. This value is set by the fabrication technology: Range is between about 5 nm to about 50 nm, typically about 20 nm; 3) Nanotip length. This value is set by the fabrication technology: Range is between about 500 nm to about 50 μm, typically about 1.5 μm; 4) Center to center distance between two neighboring nanotips in the array. This value is based on a predetermined value. The smaller the distance, the less electric-field enhancement and current per nanowire are achieved but higher packing density of nanotips is achieved, which in turn can lead to higher overall current: Range is between about 200 nm to about 3 typical about 500 nm; 5) Anode to nanotip distance. This value is set by the spacer when a standard glass or Si substrate is used for anode or Si device layer thickness in SOI anode implementation: Range is between about 300 nm to about 100 typically about 2 μm; and 6) Nanotip island area for 3-terminal vacuum transistor (Triode). This value is based on a predetermined value. If the area is large, distance between control grid and nanotips increases leading to less control by Grid. Range is between about 200 nm×200 nm (Grid control of individual nanotips) to about 5 μm×5 (typical about 2 μm×2 μm).

Those having ordinary skill in the art will recognize that numerous modifications can be made to the specific implementations described above. The implementations should not be limited to the particular limitations described. Other implementations may be possible.

The invention claimed is:

1. A field emitter array (FEA) vacuum transistor, comprising:

a substrate; and a plurality of nanorods formed of a first polarity dopant on the substrate.

2. The FEA vacuum transistor of claim 1, wherein the first polarity dopant is an N-dopant.

3. The FEA vacuum transistor of claim 1, wherein the nanorods have a center-to-center distance of between about 200 nm to about 3 μm.

4. The FEA vacuum transistor of claim 3, wherein the FEA has an average current density of between about 10 $A/cm^2$ and 100 $A/cm^2$.

5. The FEA vacuum transistor of claim 3, wherein the FEA has an average current density of between about 20 $A/cm^2$ and 80 $A/cm^2$.

6. The FEA vacuum transistor of claim 3, wherein the FEA has an average current density of between about 40 $A/cm^2$ and 600 $A/cm^2$.

7. The FEA vacuum transistor of claim 1, wherein the array is used to form a floating cathode field emitter.

8. The FEA vacuum transistor of claim 7, wherein the floating cathode field emitter forms a logical NAND gate.

9. The FEA vacuum transistor of claim 1, wherein the array is used to form a non-volatile memory.

10. The FEA vacuum transistor of claim 9, wherein the non-volatile memory is a flash memory.

11. The FEA vacuum transistor of claim 1, wherein the nanorods have nanotips with a base diameter of between about 20 nm to about 300 nm.

12. The FEA vacuum transistor of claim 1, wherein the nanorods have lengths ranging between about 500 nm to about 5 μm.

13. The FEA vacuum transistor of claim 1, wherein the substrate is a silicon on insulator.

14. The FEA vacuum transistor of claim 13, wherein an anode is bonded to the silicon on insulator substrate with a predetermined anode-cathode gap.

* * * * *